United States Patent [19]

Stiver

[11] Patent Number: 5,208,923
[45] Date of Patent: May 11, 1993

[54] SWIMMING POOL WATER FLOW SYSTEM

[76] Inventor: J. Harold Stiver, 2807 27th Ave. Dr. West, Bradenton, Fla. 34205

[21] Appl. No.: 825,994

[22] Filed: Jan. 27, 1992

[51] Int. Cl.⁵ .............................................. E04H 4/12
[52] U.S. Cl. ........................................ 4/493; 4/509; 210/169
[58] Field of Search ................... 4/490, 492, 493, 494, 4/507, 509, 541.1, 541.2; 210/169

[56] References Cited

U.S. PATENT DOCUMENTS 4,657,670  4/1987  Newton .......................... 210/169 X
4,813,396  3/1989  Sargeant et al. .................. 4/493 X Primary Examiner—William A. Cuchlinski, Jr.
Assistant Examiner—W. Morris Worth
Attorney, Agent, or Firm—Charles J. Prescott

[57] ABSTRACT

An improved swimming pool water flow system for filtering in and intermittently heating the pool water, and for interrupting water flow through the heat exchanger when no heating is required. The system improvement includes an improved water flow arrangement wherein pool water is drawn from the pool and, encountering a filter or chlorinator, is selectively diverted at a predetermined pool water outlet temperature into the heat exchanger. The water pump is thus used to pull water through the heat exchanger in counter circulating fashion only when the thermostat sensing pool water outlet temperature opens a control valve in the water flow path between the heat exchanger and the pump.

4 Claims, 1 Drawing Sheet

SWIMMING POOL WATER FLOW SYSTEM

BACKGROUND OF THE INVENTION

This invention relates generally to liquid heating systems, and more particularly to an improved heating system for swimming pools which prevents pool water flow through the heat exchanger when not in use.

Swimming pool heating devices installed within the pool water filtering arrangement have become more popular as have swimming pools themselves. One form of pool water heating incorporates a solar heating panel, typically placed atop the roof of the home.

In-line heating elements have also become more widely used. These heating elements are typically in the form of either a heat exchanger or a natural gas or propane heating element, both of which incorporate a through flow heat exchange coils.

Because pool water typically includes a small level of chlorine, continuous flow of the pool water through the heat exchanger, even when not in use, tends to reduce the life of the heat exchange coils. Additionally, these heat exchangers have a peak operating efficiency which is specified by water flow rate and/or water temperature rise across the coils.

The invention to Johnson in U.S. Pat. No. 3,786,921 is directed to an arrangement which at least partially shunts water flow through the heater coil to regulate the heating efficiency of this system.

In Leniger U.S. Pat. No. 4,279,128, a swimming pool heater is disclosed including a system bypass line, which, in conjunction with a diverter valve, diverts a portion of the circulated pool water to the pool heater.

Neither of these above systems provide for the total intermittent discontinuance of pool water flow through the heat exchanger, however.

Applicant is also aware of the flow control arrangements for solar pool heaters as disclosed in Stewart U.S. Pat. Nos. 4,261,332 and 4,307,707, and Trihey U.S. Pat. No. 4,313,421.

The present invention provides an improved water flow arrangement for swimming pool filtering systems having a heat exchanger wherein water flow through the heat exchanger is totally interrupted at predetermined pool outlet water temperatures. Additionally, flow through the heat exchanger is adjustably controllable to optimize efficiency of the heat exchanger when in use.

BRIEF SUMMARY OF THE INVENTION

This invention is directed to an improved swimming pool water flow system for filtering and intermittently heating the pool water, and for interrupting water flow through the heat exchanger when no heating is required. The system improvement includes an improved water flow arrangement wherein pool water is drawn from the pool and, before encountering a filter or chlorinator, is selectively partially diverted at or below a predetermined pool water outlet temperature into the heat exchanger. The water pump is thus used to push water through the heat exchanger in counter circulating fashion only when a thermostat sensing pool water outlet temperature opens a control valve in the water flow path between the heat exchanger and the pump.

It is therefore an object of this invention to provide an improved water flow arrangement for swimming pools having water heaters wherein water flow is interrupted through the heat exchanger when not needed.

It is another object of this invention to provide an improved water flow system for heated swimming pools which increases the useful life of the heat exchanger.

It is yet another object of this invention to provide an improved heated swimming pool water flow system which prevents chlorine gas from backing up into the heat exchanger when the system is shut off.

In accordance with these and other objects which will become apparent hereinafter, the instant invention will now be described with reference to the accompanying drawings.

DETAILED DESCRIPTION OF THE INVENTION

Figure 1:
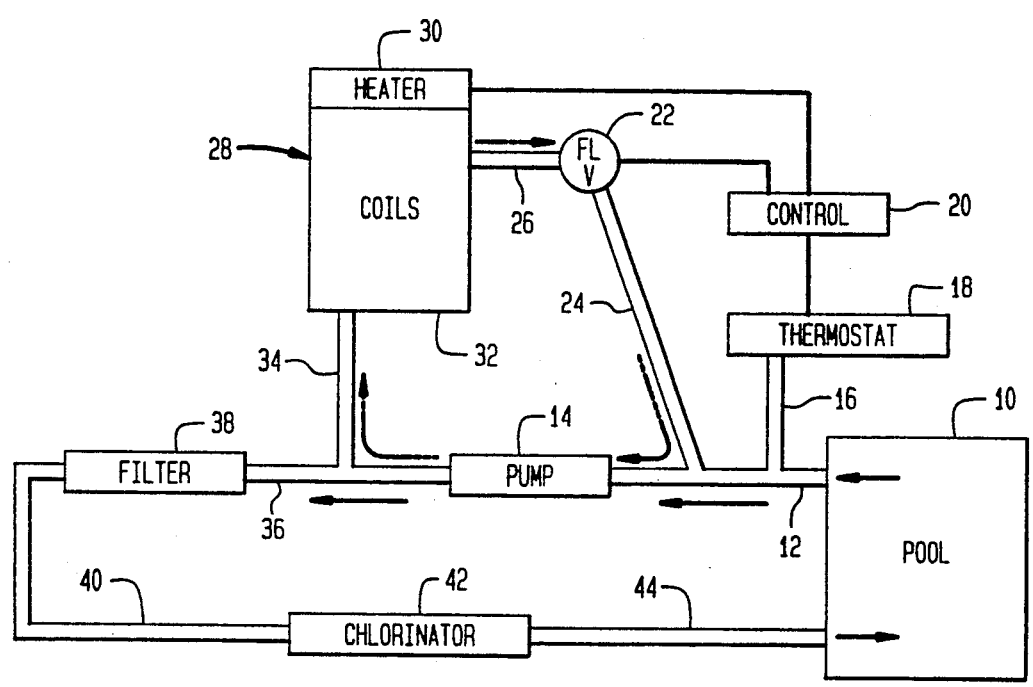
FIG. 1 is a schematic view showing the water flow system of the present invention in conjunction with a swimming pool

Referring now to FIG. 1, the invention is shown in schematic and includes a swimming pool 10 having a pool water outlet 12 connected in series to the inlet of a water pump 14. The outlet of the water pump 14 is connected by water conduit 36 to the inlet of a conventional swimming pool water filter 38. The remainder of this conventional flow arrangement typically includes a chlorinator 42 connected downstream and in series with filter 38 discharging to a water inlet 44 of pool 10.

The improvement of the present invention comprises a heat exchanger 28 which includes a means for providing a source of heat 30 and heat exchange coils 32 through which water may flow in heat exchange fashion so as to absorb heat generated by heater 30 in a well known manner. This heat exchanger 28 has its coil inlet connected immediately downstream of the pump 14 into conduit 36 by conduit 34.

The outlet 26 of the heat exchange coil 32 is connected to a water flow regulator valve 22. The preferred embodiment of this valve is manufactured by Hardie under its model number 700.1 series valve which is solenoid operated to controllably shut off flow therethrough and also may be regulated to control the amount of water flow therethrough when the solenoid is in its open position. By the use of such a regulatable shut-off valve 22, an optimum amount of water flow through the heat exchanger 28 may be achieved. Typically this ideal flow rate is in the range of about three gallons per minute per nominal ton of heating to achieve approximately 12 degrees of liquid heating differential between the inlet 34 and the outlet 26 of coils 32.

The outlet of valve 22 is connected by conduit 24 to the inlet side of pump 14. Thus, by this arrangement, when valve 22 is in its open position, a portion of the pool water drawn from the pool 10 through its outlet 12 into pump 14 is diverted into conduit 34 as shown by the arrow in phantom. This diverted pool water is circulated through coils 32 and then returns by conduit 24 back into pump 14. By this arrangement, a diverted recirculation of a portion of the pool water through heating coils 32 and back into pump 14 is achieved.

To properly regulate the opening and closing of valve 22, a thermostat 18 senses pool outlet water temperature within conduit 16, the only accurate point at which to measure pool water temperature. The thermostat 18 then provides a signal to control 20 which, in turn, energizes and opens the solenoid of valve 22 and simultaneously activates heater 30. By this arrangement, diverted flow through coils 32 is simultaneously started with the activation of heater 30. Thus, water flows through coils 32 and the energizing of heater 30 is interrupted below a preselected pool water outlet temperature by thermostat 18 and, of course, when the entire water filtering system and pump 14 are shut off.

In addition to preventing the flow of pool water through coils 32 except as regulated and controlled as hereinabove described, the present invention also inhibits the introduction of chlorine gas from chlorinator 42 into coils 32 when the heat exchanger 28 is inactive. This is accomplished by placing chlorinator 42 downstream in series with filter 38 so that any chlorine gas generated within chlorinator 42 when the entire system, including pump 14, is inactive, unable to reach coils 32. This feature is provided because chlorine gas itself is detrimental to the life of coils 32.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. In a swimming pool water flow system including a water pump having an inlet thereof connected to a pool water outlet and a water filter connected in series between an outlet of said pump and a pool water inlet, the improvement comprising:
   a heat exchanger for heating water having an inlet operably connected at said pump outlet and an inlet of said filter;
   a water flow control valve operably connected in series between an outlet of said heat exchanger and said pump inlet structured for regulating the flow of water from said pool through said heat exchanger;
   water temperature control means operably connected between said pool outlet and said heat exchanger and said valve for sensing the temperature of water in said pool and for opening said valve and activating said heat exchanger at a predetermined pool outlet water temperature.

2. An improved swimming pool water flow system as st forth in claim 1, further comprising:
   a chlorinator positioned downstream of, and in series with, said filter whereby chlorine gas is prevented from backing up into said heat exchanger when said system is shut off.

3. In a swimming pool water filtering and heating system comprising:
   a water pump connected in series between a swimming pool water outlet and an inlet of a water filter;
   said water filter having an outlet connected to a water inlet of said swimming pool;
   a heat exchanger having an inlet thereof connected to an outlet of said water pump and an outlet of said heat exchanger connected to a water flow control valve, an outlet of said valve connected to an inlet of said water pump;
   means for sensing water temperature at said swimming pool outlet and for opening said valve and activating said heat exchanger only below a predetermined temperature of water in said swimming pool outlet.

4. An improved swimming pool water filtering and heating system as in claim 3, further comprising:
   a chlorinator positioned downstream of, and in series with, said filter whereby chlorine gas is prevented from backing up into said heat exchanger, when said system is shut off.

* * * * *